Aug. 5, 1969     E. O. KNIGHT     3,459,542
POWDER METALLURGICAL PROCESS FOR PRODUCING
LOW CARBON FERROCHROMIUM
Filed Nov. 1, 1966
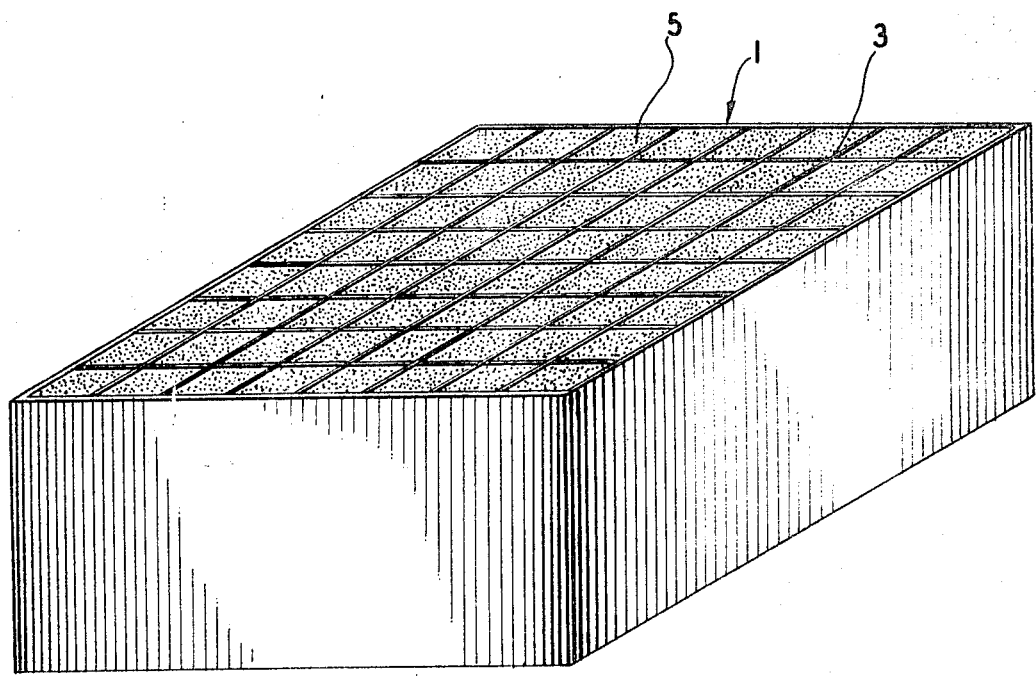
INVENTOR
ERNEST O. KNIGHT
BY
ATTORNEY

3,459,542
POWDER METALLURGICAL PROCESS FOR PRODUCING LOW CARBON FERROCHROMIUM
Ernest O. Knight, Marietta, Ohio, assignor to Union Carbide Corporation, a corporation of New York
Filed Nov. 1, 1966, Ser. No. 591,184
Int. Cl. C22c 33/00, 39/14
U.S. Cl. 75—130.5    3 Claims This invention relates to the decarburization of high carbon ferrochromium. More particularly, this invention relates to an improved vacuum furnace process for decarburizing high carbon ferrochromium.

Low carbon ferrochromium, e.g. FeCr containing a maximum of 0.025% carbon is a material of considerable industrial utility in steel-making, however, in view of the strong natural affinity of chromium for carbon, special processing procedures have been required in the past in the making of this material. For example, as described in United States Patents 2,473,019, 2,473,020 and 2,473,021 low carbon ferrochromium has been made by providing high carbon ferrochromium and an oxidant in a very finely divided state, subsequently mixing, and briquetting these materials and then vacuum furnacing the briquets at high temperatures to cause a solid state reaction between the briquet constituents. Briquetting has been previously considered essential to produce a product of suitably high density and to provide as rapid as possible a reaction rate between the briquetted materials so as to avoid excessively long reaction times. It has therefore been necessary, under industrial operation conditions, to use extremely fine particle sizing for the briquet constituents, e.g. on the order of 5 microns average size for the high carbon ferrochromium and about 3 microns for the oxidized ferrochromium. Furthermore, the necessity for briquetting large quantities of materials of this size requires a considerable expenditure of time and effort and the use of relatively expensive equipment.

It is therefore an object of the present invention to provide a process for producing low carbon ferrochromium without the use of extremely fine sized high carbon ferrochromium starting materials.

It is another object of the present invention to produce low carbon ferrochromium without the need for briquetting or otherwise consolidating the starting materials.

It is a further object of the present invention to provide a strong, dense, low carbon ferrochromium product.

Other objects will be apparent from the following description and claims in conjunction with the drawing which shows a receptacle arrangement suitable for the practice of the present invention.

A process in accordance with the present invention broadly comprises providing a dry, loose mix of finely divided high carbon ferrochromium and oxidant in which the average particle sizing of the ferrochromium is about 10 to 20 microns, with at least about 10% of the ferrochromium being held on a 200 mesh test screen, balance substantially all through 200 mesh, and in which the average particle sizing of the oxidant is about 3 to 5 microns; introducing the dry mix into a container formed of heat disposable material; and subjecting the contained mixture to vacuum furnacing whereby the container is consumed and the mixture reacted in the solid state to provide a product containing less than about 0.025% carbon.

The final product obtained through the practice of the present invention has high density and strength and has a significantly lower porosity as compared to the previously known briquetted product and is produced in a shape corresponding to the original dimensions of the heat disposable container into which it was introduced prior to furnacing. That is to say, in the present invention, through the selection of a particular particle sizing for the ferrochromium and oxidant reactants, and using a dry, loose mix in a heat disposable container, a low carbon ferrochromium product can be obtained by vacuum furnacing which has the same shape as the heat disposable container even through the container itself is consumed and destroyed in the course of the vacuum furnacing.

In the practice of a particular embodiment of the present invention, finely divided high carbon ferrochromium (64 to 72% Cr, 4 to 9% C) having an average particle size in the range of 10 to 20 microns and a typical screen analyses as follows:

| | Percent |
|---|---|
| Held on 200 mesh screen | 10 |
| Through 200 mesh screen | 90 | is mixed dry, without any water, binder or slag additions in a Muller type mixer with oxidized ferrochromium sized finer than 5µ and having an average particle size of 3 to 5µ. The amount of oxidized ferrochromium should be at least equal to and preferably slightly in excess of that required to supply the necessary oxygen to react with and remove as gas the desired amount of carbon from the high carbon ferrochromium, i.e. to produce a product containing not more than 0.025% carbon. A typical ratio of high carbon ferrochromium (5.5% C.) to oxidant (oxidized ferrochromium) is about 2.5 to 1. After blending, the mixture is transferred to a hopper and loaded from the hopper into a horizontally disposed, open topped cardboard form, such as the type indicated in the drawing and indicated at 1, having a plurality of compartments or cells 3 which is arranged horizontally on a flat bedded wheeled platform or hearth car. The cardboard form, of about ⅛ inch thickness suitably about 16 to 18 inches high, and having compartments about 4 inches x 4 inches in cross-section is filled to the top with the ferrochromium-oxidant mixture indicated at 5 and the hearth car is rolled into a vacuum furnace. The furnace is sealed and evacuated and the ferrochromium-oxidant mixture is subjected to a vacuum heating cycle which causes reaction of the mixture and the production of the desired low carbon product. In the course of heating, the cardboard containers are consumed and destroyed, however, the mixture in the containers retains the original shape as initially defined by the compartments in the cardboard form and the final product is obtained in the form of individual blocks or bricks. Suitable vacuum heating cycles are generally disclosed in the aforementioned United States patents. A typical heating cycle suitable for the practice of the present invention involves evacuating the furnace to about 250 microns prior to heating, followed by heating to 2260° F. over a period of 6 hours and holding at this temperature for 2 hours; then heating to 2525° F. over a period of 24 hours; holding at this temperature for about 70 hours and then cooling to below 600° F. before exposure to the atmosphere.

The product obtained is characterized by a very low carbon content, e.g. less than 0.025%, which is comparable to that obtained following the previous briquetting practice, in addition the product of this invention has been found to have a higher density, and hence a lower porosity than the briquetted product. Tests made to measure the apparent density for paraffin-coated specimens showed the following results.

| Material: | Density in g./cc. |
|---|---|
| Product of this invention | 5.63 |
| Briquetted product | 5.27 |

The briquetted product was made using the same heating cycle, and starting materials having the same composition, as that used in making the product of this invention. The only difference was that the high carbon ferrochromium in the briquetted product had an average particle size of 5–7 microns as compared to an average particle size of 10 microns in the present invention. The briquetted product was in the form of pressed bricks 8 inches x 4½ inches x 4 inches whereas in the present invention, a loose mix was used.

The increased density of the present invention noted above is highly advantageous in that it facilitates the addition thereof to steel baths by more readily penetrating the slag cover of the bath.

The following Table I shows a typical mix order and product analysis in accordance with the present invention.

Table I

High carbon ferrochromium:
68% Cr; 22% Fe; 6% C; 2% Si
Oxidized ferrochromium:
53% Cr; 18% Fe; 0.9% C; 1.5% Si
Ratio by weight of high carbon
ferrochromium to oxidized ferrochromium:
3 to 1
Product analysis:
70% Cr; 25% Fe; .020% C; 1.75% Si The following Table II shows suitable operable ranges for thec ompositions of high carbon ferrochromium and oxidized ferrochromium starting materials in the practice of the present invention.

Table II

High Carbon ferrochromium:
64 to 72% Cr; 4 to 9% C; 1 to 6% Si
Oxidized ferrochromium:
50 to 55% Cr; 0.2 to 1.5% C; 1 to 2% Si
Ratio of high carbon ferrochromium
to oxidized ferrochromium:
2:1 to 4:1

It has been found in the practice of the present invention that aforementioned particle sizing range for the high carbon ferrochromium in the loose mix is critical in order to provide a low carbon, i.e. less than 0.025% C, product. For example, tests performed using a loose mix having the same ferrochromium particle sizing as that employed in the commercial briquet practice, i.e. 5–7 microns average size, showed that a satisfactory low carbon product could not be obtained. It was found that using a loose mix with the ferrochromium constituent sized 5–7 microns average particle size, a product having a carbon content of 0.025% or less could not be obtained regardless of the temperatures, pressures and operating times used.

In addition to the specifically mentioned cardboard forms, other heat disposable materials such as wood can be used and it is preferred that the form material be such that it substantially retains its integrity during processing up to a temperature of about 500° F.

In addition to oxidized ferrochromium, other oxidants can be used such as high purity chrome ore or ion oxide.

The mesh sizes referred to herein are Tyler Standard Screen Scale Sieves.

What is claimed is:

1. In the vacuum decarburization of a high carbon ferrochromium-oxidant mixture by heating the mixture at elevated temperatures under vacuum conditions to provide a chromium product containing a maximum of about 0.025% of carbon and about 64 to 72% chromium, the improvement which comprises:

(1) providing a high carbon ferrochromium-oxidant mixture in the form of a dry, loose, mixture in which the average particle sizing of the high carbon ferrochromium is about 10 to 20 microns with at least 10% of the ferrochromium particles being retainable on a 200 mesh screen and in which the average particle sizing of the oxidant is about 3 to 5 microns, (2) introducing the mixture prior to heating, into a heat consumable container of predetermined size and, (3) heating the mixture in said container to cause reaction of the mixture and the production of the desired low carbon ferrochromium product whereby in the course of said heating the container is decomposed.

2. A process in accordance with claim 1 wherein the heat disposable container has a plurality of horizontally disposed open-topped, substantially same sized compartments of rectangular cross-section.

3. A process in accordance with claims 1 wherein the oxidant is oxidized ferrochromium and the heat disposable container is made of cardboard.

References Cited

UNITED STATES PATENTS

| 2,030,200 | 2/1936 | Gallup | 264—317 |
| 2,473,019 | 6/1949 | Erasmus | 75—130.5 |
| 2,473,020 | 6/1949 | Erasmus | 75—130.5 |
| 2,473,021 | 6/1949 | Spendelow et al. | 75—130.5 |

L. DEWAYNE RUTLEDGE, Primary Examiner

T. R. FRYE, Assistant Examiner

U.S. Cl. X.R.

75—000, 200; 264—111